United States Patent [19]
Yuuki et al.

[11] 4,310,813
[45] Jan. 12, 1982

[54] CROSS POLARIZATION COMPENSATING SYSTEM

[75] Inventors: Hironori Yuuki, Niza; Kazunori Inagaki, Yokohama; Makoto Arai, Tokyo; Noboru Baba, Higashikurume; Matsuichi Yamada, Yokohama; Hiroshi Kurihara, Atsugi, all of Japan

[73] Assignee: Kokusai Denshin Denwa Kabushiki Kaisha, Tokyo, Japan

[21] Appl. No.: 154,096

[22] Filed: May 28, 1980

[30] Foreign Application Priority Data

Jun. 5, 1979 [JP] Japan .................. 54/70377

[51] Int. Cl.³ .................. H04B 7/00; H01P 1/161
[52] U.S. Cl. .................. 333/117; 333/21 A; 333/17 R; 343/100 PE; 455/60; 455/63
[58] Field of Search ............ 333/17, 21 A, 134–137, 333/100, 117; 343/100 PE; 370/6, 20; 455/60, 63

[56] References Cited

U.S. PATENT DOCUMENTS

| | | | |
|---|---|---|---|
| 4,027,105 | 5/1977 | Kannowade | 333/21 A X |
| 4,090,137 | 5/1978 | Soma et al. | 343/100 PE X |
| 4,233,576 | 11/1980 | Pelchat | 333/21 A X |

*Primary Examiner*—Paul L. Gensler
*Attorney, Agent, or Firm*—Robert E. Burns; Emmanuel J. Lobato; Bruce L. Adams

[57] ABSTRACT

A cross polarization compensating system, in which two elliptically polarized waves of opposite polarities are applied to a cascade connection of two successively connected rotatable 90° phase shifters and an Orthomode (Trademark) transducer. Two cross polarized wave components of the two elliptically polarized waves are detected from the two perpendicularly intersecting output terminals of the Orthomode (Trademark) transducer. Two in-phase components of the same phase as their co-polarized components of the two cross-polarized wave components and two orthogonal components each having a phase difference of 90° from corresponding one of the co-polarized waves of the two cross-polarized wave components are detected from the two output terminals of the Orthomode (Trademark) transducer. One of the two phase shifters is controlled by an addition output of the two in-phase components while the other of the two phase shifters is controlled by a difference output between the two orthogonal components, so that two elliptically polarized waves at the output terminals of the Orthomode (Trademark) transducer are made equal in the cross polarization, and so that a phase difference between the co-polarized wave components and a phase difference between the cross-polarized wave components are made equal in magnitude and opposite in sign.

2 Claims, 15 Drawing Figures

CROSS POLARIZATION COMPENSATING SYSTEM

BACKGROUND OF THE INVENTION

1. Field of the Invention

This invention relates to a cross polarization compensating system which removes cross polarization interference from two elliptically polarized waves of degraded cross polarization discrimination to provide correct, orthogonally polarized waves.

2. Description of the Prior Art

As a kind of radio communication, there is orthogonal dual-polarization communication which is intended to increase the channel capacity through utilization of orthogonal polarized waves of the same frequency, which are, for example, a vertically polarized wave and a horizontally polarized wave or a clockwise polarized wave and a counterclockwise polarized wave. When carrying this system into practice, it is necessary to minimize degradation of the cross polarization discrimination which occurs in a transmitting and receiving antenna system and on a propagation path. To this end, it is important to improve the cross polarization characteristic of the antenna system and to compensate for degraded cross polarization discrimination on the propagation path. The cross polarization which occurs on the propagation path is mostly caused by a raindrop. The harder rain becomes, the flatter the raindrop becomes, providing attenuation and phase differences between polarized waves which propagate in directions of the longer and the shorter axis of the raindrop. As a consequence, the orthogonality of the polarizations is lost and the polarized waves become elliptically polarized ones, resulting in the cross polarization discrimination being degraded. As a method for effectively compensating for such degraded cross polarization discrimination, there has heretofore been proposed a method in which cross polarization caused by the non-isotropy of the phase characteristic is compensated for by a first compensating part using two rotatable phase shifters, so that cross polarization caused by the non-isotropy of the attenuation characteristic is cancelled by a second compensating part. This prior art system is classified into the following two systems according to a difference in the operation of the first compensating part.

One of them is a system (I) which makes the major axes of two polarized waves perpendicular to each other; namely, two arbitrary elliptically polarized waves are converted by rotatable 90° and 180° phase shifters into elliptically polarized ones whose major axes are perpendicular to each other at the input of an Orthomode (Trademark) transducer (OMT). (See 1975 IEEE International AP-S Symposium Digest, P 209-212, "Adaptive Polarization Control for Satellite Frequency Reuse System"; and Japanese patent application Disclosure No. 115717/76).

The other system is one which converts one of the two polarized waves into a linearly polarized one. This system is characterized by conversion of two incoming elliptically polarized waves into a linearly polarized one. (See 1977 IEEE International AP-S Symposium, PP 173-176, "Broadband Adaptively Controlled Polarization Network"). As for the phase shifters, there have been proposed a system of combining 90° and 180° phase shifters and a system (II) of using two 90° phase shifters. (See Japanese patent applications Disclosure No. 97719/78 and U.S. Pat. application Ser. No. 007,463 filed Jan. 29, 1979).

In the above conventional system, the set angles of the phase shifters are not uniquely determined with respect to orthogonal, circularly polarized waves.

SUMMARY OF THE INVENTION

An object of the present invention is to provide a cross polarization compensting system, which overcomes the abovesaid defects of the prior art systems, and which is capable of effectively compensating for degradation of cross polarization discrimination which occurs in an antenna system and in a propagation path.

A cross polarization compensating system is disclosed, in which two elliptically polarized waves of opposite polarities are applied to a cascade connection of two successively connected rotatable 90° phase shifters and an Orthomode (Trademark) transducer. An Orthomode (Trademark) transducer, or OMT or transducer means, is a transducer having two perpendicularly intersecting output terminals for producing two cross-polarized wave outputs. Two cross-polarized wave components of the two elliptically polarized waves are detected from the two perpendicularly intersecting output terminals of the Orthomode (Trademark) transducer. Two in-phase components of the same phase as their co-polarized components of the two cross-polarized wave components and two orthogonal components each having a phase difference of 90° from corresponding one of the copolarized waves of the two cross-polarized wave components are detected from the two output terminals of the Orthomode (Trademark) transducer. One of the two phase shifters is controlled by an addition output of the two in-phase components while the other of the two phase shifters is controlled by a difference output between the two orthogonal components, so that two elliptically polarized waves at the output terminals of the Orthomode (Trademark) transducer are made equal in the cross polarization, and so that a phase difference between the copolarized wave components and a phase difference between the cross-polarized wave components are made equal in magnitude and opposite in sign. Residual cross polarization components can be substantially compensated by a simple circuit construction.

BRIEF DESCRIPTION OF THE DRAWINGS

The construction and operation of this invention will be clearly understood from the following detailed description taken in conjunction with the accompanying drawings, in which.

DETAILED DESCRIPTION

Figure 1:
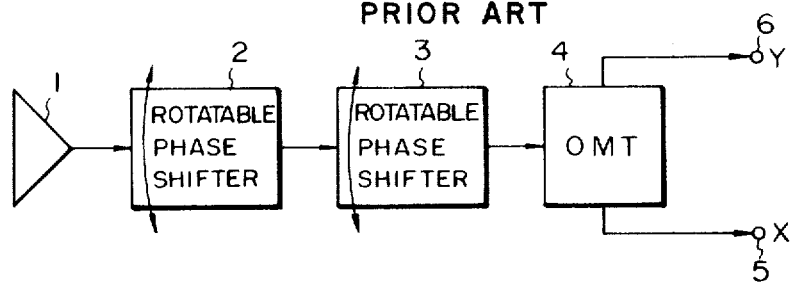
FIG. 1 is a block diagram showing the arrangement of a cross polarization compensating device to which the present invention is applied.
Figure 2A:
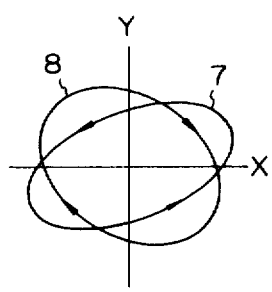
FIGS. 2A, 2B, 2C, 3A, 3B and 3C illustrate polarized wave diagrams explanatory of the operation principles of conventional cross polarization compensation systems.
Figure 2B:
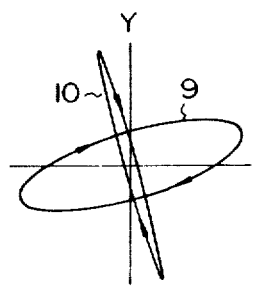
Figure 2C:
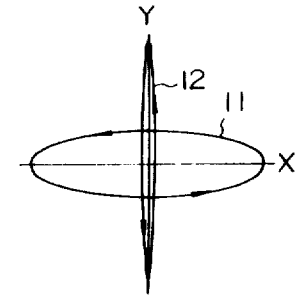

To make differences between this invention and prior arts clear, examples of prior art systems will first be described. An example of the arrangement of the conventional system I is shown in FIG. 1. In FIG. 1, reference numeral 1 indicates an antenna; 2 and 3 designate rotatable phase shifters; 4 identifies an OMT having output ends which mutually intersect perpendicularly; and 5 and 6 denote such output ends. FIG. 2 shows the states of polarized waves, explanatory of the operation of this system. For convenience of description, a compensating operation of a receiving system will be considered; the output end 5 of the OMT 4 is used as a reference axis, that is, the X axis and the other output end 6 is used as the Y axis. The polarized waves received by the antenna 1 are a counterclockwise elliptically polarized wave 7 and a clockwise elliptically polarized wave 8. In general, these polarized waves differ in axial ratio and their major axes do not mutually intersect perpendicularly. When a phase delaying face of the 90° phase shifter 2 is inserted for the two elliptically polarized waves 7 and 8 at a position which is determined by their axial ratio and the tilt angle, as shown in FIG. 2A, the two elliptically polarized waves 7 and 8 are converted into elliptically polarized waves 9 and 10, such as shown in FIG. 2B, which revolve in the same direction and whose major axes mutually intersect perpendicularly. Then, since the 180° phase shifter 3 reverses the direction of revolution of the polarized waves but has the function of rotating the major axis inclination angle without changing the configuration of the polarized waves and their relative relationships, the 180° phase shifter rotates the two polarized waves 9 and 10, providing at the output ends 5 and 6 of the OMT 4 such elliptically polarized waves 11 and 12, as shown in FIG. 2C, whose major axes coincide with each other. As a result of this, the power of the elliptically polarized wave 7 is mostly derived from the output end 5, and the power of the elliptically polarized wave 8 is mostly derived from the output end 6. This system can also be achieved by using a 180° phase shifter as the phase shifter 2 and a 90° phase shifter as the phase shifter 3.

Figure 3A:
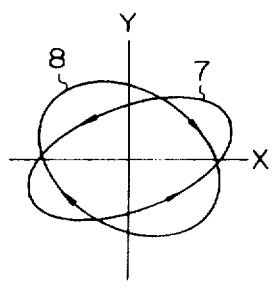
Figure 3B:
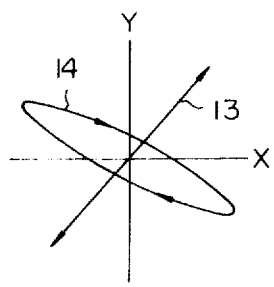
Figure 3C:
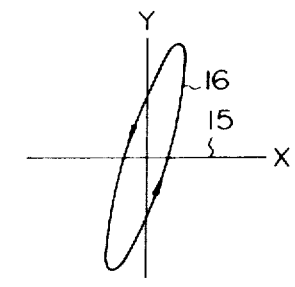

FIGS. 3A, 3B and 3C show the manner how the polarized waves are converted by the system II in a case where the phase shifters 2 and 3 are 90° and 180° phase shifters respectively. As is the case with the system I, the two elliptically polarized waves 7 and 8 shown in FIG. 3A are received by the antenna 1. By inserting the phase delaying face of the 90° phase shifter 2 for the elliptically polarized wave 7 in the direction of its major axis, the polarized wave 7 is converted into a linearly polarized wave 13, as shown in FIG. 3B. On the other hand, the polarized wave 8 is converted into an elliptically polarized wave 14 different from the input wave. These polarized waves 13 and 14 are rotated by the 180° phase shifter 3, by which there can be obtained a linearly polarized wave 15 which coincides with the X axis as shown in FIG. 3C. The power of the polarized wave 16 is almost derived from the output end 6 of the OMT 4 and is free from interference of the polarized wave 7. The power of the polarized wave 7 is all derived from the output end 5 but still suffers interference of the polarized wave 8.

In both of the system I and II, in a case where it is necessary to remove residual cross polarization components in the OMT outputs, a second compensating part is provided at the output side of the OMT for cancelling the cross polarization. The second compensating part in the system I is composed of two sets, each of which comprises a directional coupler, a variable attenuator and a fixed phase shifter. In this system II, the second compensating part comprises a directional coupler, a variable attenuator and a variable phase shifter; in this case, since the cross polarization discrimination of one of the polarized waves is infinity, one set of circuits will be eliminated. In the system I, cross polarization discriminations of the polarized waves 7 and 8 at the output ends 5 and 6 of the OMT 4 are not equal to each other, and further, since the 180° phase shifter is used, there is a defect such that the set angle of the phase shifters 2 and 3 are not uniquely determined with respect to orthogonal, circularly polarized waves. On the other hand, in the system II, the cross polarization discrimination of the polarized wave 7 becomes infinity, but the cross polarization discrimination of the polarized wave 8 becomes lower than in the case of the system I. Also in the system II, if the 180° phase shifter is employed, the set angles of the phase shifters 2 and 3 are not determined with respect to orthogonal, circularly polarized waves.

The present invention will hereinafter be described in detail.

Figure 4A:
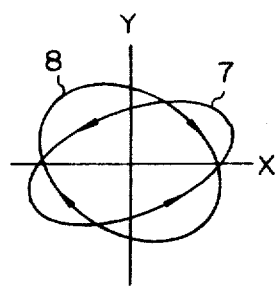
FIGS. 4A, 4B and 4C illustrate polarized wave diagrams explanatory of operation principles of the present invention.
Figure 4B:
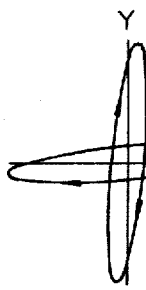
Figure 4C:
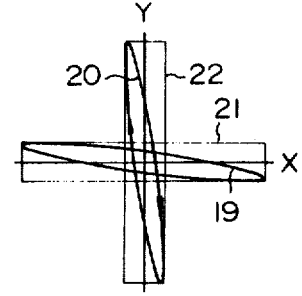
Figure 5:
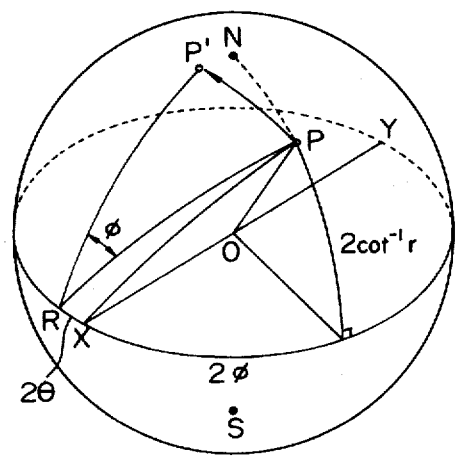
FIG. 5 is a diagram showing polarized waves using a Poincare sphere.
Figure 6:
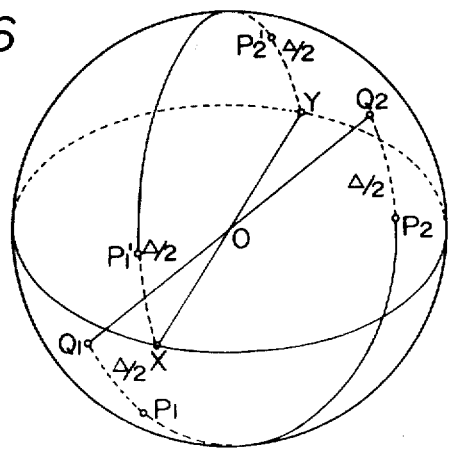
FIG. 6 is a diagram showing polarized waves using a Poincare sphere explanatory of the operation of the present invention.
Figure 7:
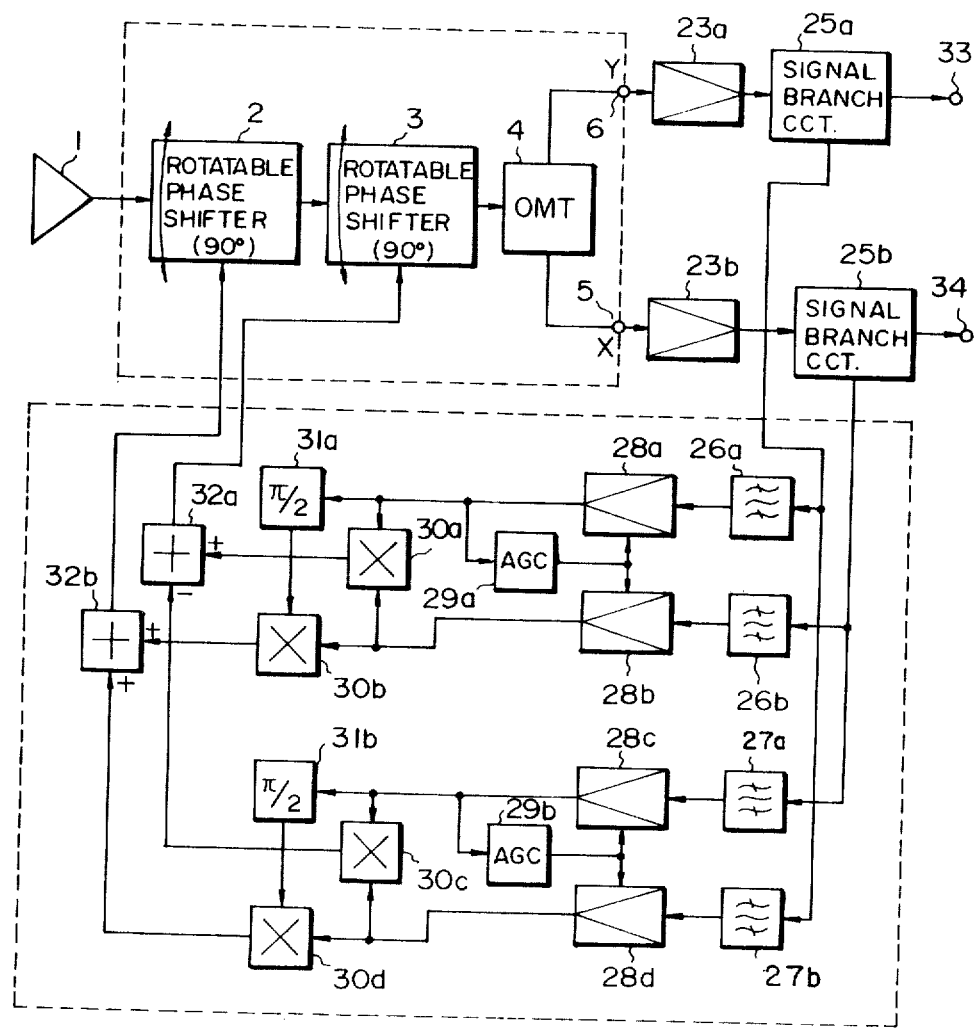
FIG. 7 is a block diagram illustrating an embodiment of the present invention.
Figure 8:
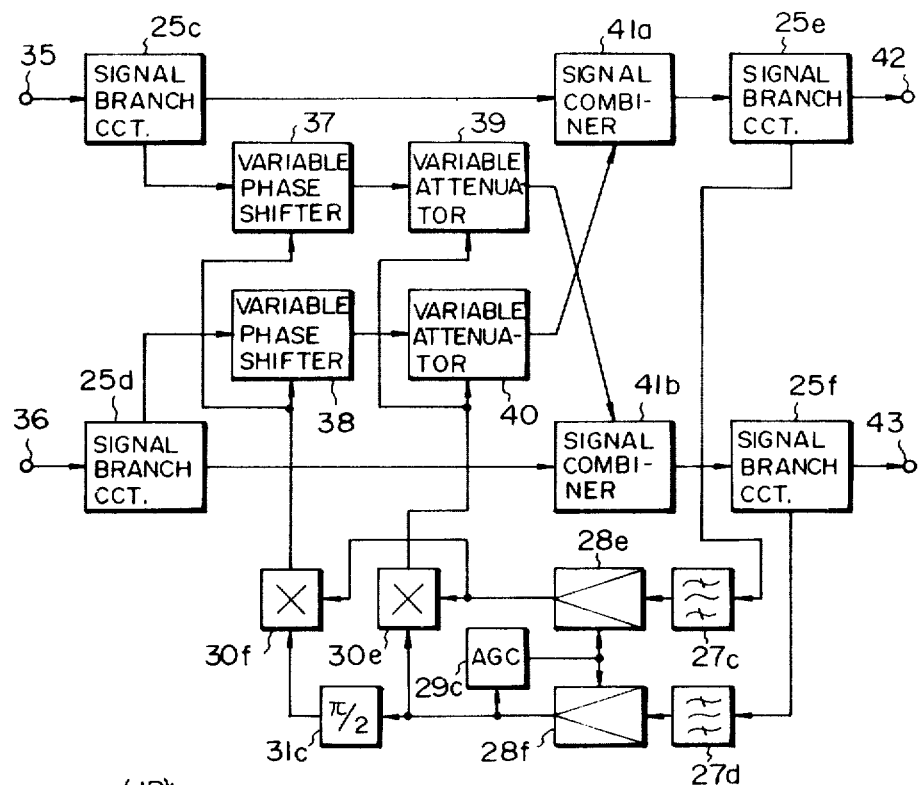
FIG. 8 is a block diagram illustrating an example of an additional device for improving the orthogonality of an output according to the system of the present invention.
Figure 9:
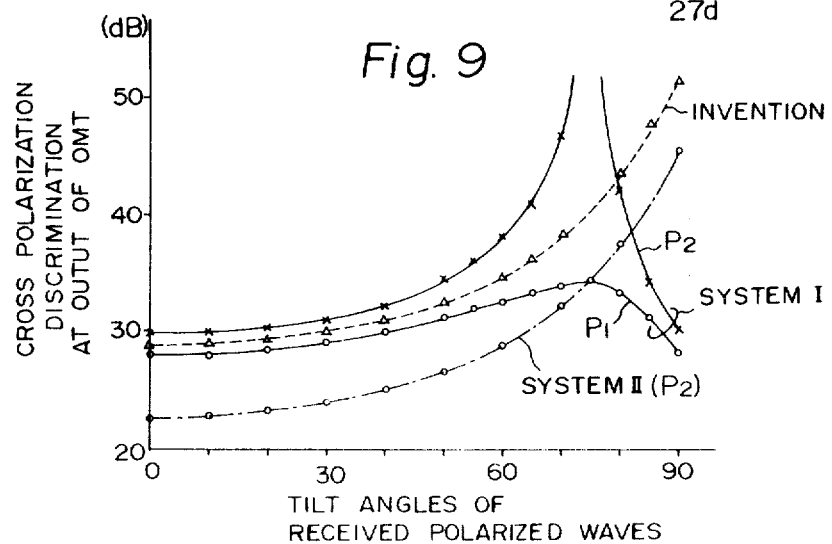
FIG. 9 is a characteristic diagram showing, in comparison, cross polarization discriminations in cases of prior art systems and a case of the system of the present invention.

FIGS. 4A, 4B and 4C show the states of polarized waves, explanatory of the operation of the present invention; FIG. 5 is a diagram explanatory of a method of showing polarized waves using a Poincaré sphere for facilitating a better understanding of the present invention; and FIG. 6 is a diagram for describing the operation principles of the present invention in more detail. FIGS. 7 and 8 illustrate embodiments of a compensator of the present invention, and FIG. 9 shows, by way of example, differences in the performance of the first compensating part between the prior art system and the present invention.

Referring first to FIGS. 4A, 4B and 4C, the operation of the present invention will be described. FIG. 4A shows the states of polarized waves in a case where the rotating type phase shifters 2 and 3 in FIG. 1 are both 90° phase shifters. At first, the phase delaying face of the rotatable 90° phase shifter 2 is set at a position which is determined by the axial ratio of the two elliptically polarized waves 7 and 8 received by the antenna 1 and by a difference in the tilt angles between the two polarized waves 7 and 8. By this, the received polarized waves 7 and 8 are respectively converted into polarized waves 17 and 18 as depicted in FIG. 4B. The polarized waves 17 and 18 usually differ in axial ratio and their direction of rotation may differ in some cases. By setting the phase delaying face of the rotatable 90° phase shifter 3 at a proper position with respect to the two polarized waves 17 and 18, they are respectively converted into polarized waves 19 and 20 as depicted in FIG. 4C. These two polarized waves 19 and 20 are equal in the axial ratio and identical in the direction of revolution, and the sum of their major axis inclinations is always 90°. Further, the two polarized waves 19 and 20 are respectively in contact with rectangles 21 and 22 shown in FIG. 4C. The ratio between the longer and the shorter side of the rectangles 21 and 22 is dependent on the states of the polarized waves 7 and 8 which are received by the antenna. The ratio between the longer side and the shorter side of each of the rectangles 21 and 22 is equal to the ratio between co-polarization and cross polarization components of each polarized wave at the output of the OMT 4 and represents the cross polarization discrimination at the output of the OMT 4. That is, the present system is characterized in that two input elliptically polarized waves are simultaneously converted, at the input of the OMT, into elliptically polarized waves which are each inscribed in a rectangle such that the ratio of the lengths in the directions of the shorter and longer sides is minimum.

The operation principles of the present invention will be described in more detail using a Poincaré sphere. A brief description will be given first, with reference to FIG. 5, of a method of showing a polarized wave by the Poincaré sphere having a radius of 1. Let it be assumed that the axial ratio of a polarized wave is positive in a case of a clockwise polarized wave and negative in a case of a counterclockwise polarized wave and that the tilt angle is positive when measured counterclockwisely from X axis. With this, a given polarized waves can have one-to-one correspondence with points on the spherical surface. For example, a polarized wave which has an axial ratio Y and a tilt angle $\Psi$ corresponds to a point P which is $2\Psi$ in longitude and $2\cot^{-1}r$ in latitude on the Poincaré sphere depicted in FIG. 5. The north pole N corresponds to a clockwise, circularly polarized wave, the south pole S corresponds to a counterclockwise, circularly polarized wave and a point on the equator corresponds to a linearly polarized wave. Especially, a point X, which is 0° both in longitude and in latitude, shows a horizontally polarized wave and a point Y symmetrical to X with respect to the center O of the sphere, that is, a point which is 180° in longitude and 0° in latitude, represents a vertically polarized wave. Furthermore, points on the norther hemisphere correspond to clockwise, elliptically polarized waves, whereas points on the southern hemisphere correspond to counterclockwise, elliptically polarized waves. The length $\overarc{PX}$ of a minor arc between the points P and X represents the intensity ratio of vertically to horizontally polarized wave components, and the angle between the length $\overarc{PX}$ and the equator represents a phase difference between the two components. When a phase shifter is inserted for a certain polarized wave, its state changes. For example, in FIG. 5, to impart a phase delay $\phi$ to the polarized wave P in a direction of $\theta$ from the X axis means that the point P is shifted to a point P' by rotation about a point r at a longitude of $2\theta$ on the equator by $\phi$, and the axial ratio and the tilt angle of the polarized wave thus shifted can easily be obtained from the latitude and the longitude of the point P'. On the basis of the above, the operation principles of the present invention will be described with reference to FIG. 6.

Now, two elliptically polarized waves received by an antenna are represented by two points $P_1$ and $P_2$ on the Poincaré sphere. Let it is assumed that the two received polarized waves are reverse in the direction of revolution and differ in axial ratio and that tilt angles do not intersect perpendicularly to each other. Accordingly, $\overarc{P_1P_2}\neq \pi$. Then, it is provided that $\Delta=\pi-\overarc{P_1P_1}$ and on an extension or an arc $\overarc{P_1P_2}$, two points $Q_1$ and $Q_2$ are set which are $\overarc{P_1Q}=\overarc{P_2Q_2}=\Delta$. Apparently, $\overarc{Q_1Q_2}=\pi$ and the points $Q_1$ and $Q_2$ are symmetrical with respect to the center O of the sphere. By properly rotating this imaginary polarized wave $Q_1$ on the Poincaré sphere, that is, giving a phase delay to the polarized wave in a proper direction, the point $Q_1$ can be brought into agreement with the point X. Even if the polarized wave is rotated as described above, the relative positions of the points on the spherical surface remain unchanged; therefore, the point $Q_2$ coincides with the point Y because $\overarc{Q_1Q_2}=\pi$. By such rotation, the points $P_1$ and $P_2$ also shift to points $P'_1$ and $P'_2$, but since their relative positions remain unchanged as described above, it holds true that $\overarc{XP'_1}=\overarc{YP'_2}=\Delta/2$. As described previously in connection with FIG. 5, $\overarc{XP'_1}$ represents the ratio of a Y-direction field component of the polarized wave $P'_1$ to its X-direction field component, and $\overarc{YP'_2}$ represents the ratio of a X-direction field component of the polarized wave $P'_2$ to its Y-direction field component. This is nothing but the cross polarization discrimination at the OMT output after compensation of the polarized waves $P_1$ and $P_2$. That is, with such a compensating operation, the two polarized waves are equal in a cross polarization discrimination at the OMT output and their phase differences are equal to each other in amount but opposite in sign.

The operation of shifting the point $Q_1$ to the point X means conversion of the elliptically polarized wave represented by the point $Q_1$ to a horizontally polarized wave. This can be achieved by using two 90° phase shifters. A combined use of a 90° phase shifter and a 180° phase shifter is also possible for the above operation but has a defect such that the set angle of the 180° phase shifter with respect to orthogonal, circularly polarized waves cannot be determined.

For automatically performing the compensating operation according to the present invention, the amplitude and the phase of the cross polarization component of each of two polarized waves at the OMT output are detected and these detected signals are used as control signals of the rotatable phase shifters. Letting the cross polarization outputs with respect to the co-polarized wave outputs of the polarized waves $P_1$ and $P_2$ at the OMT output be represented by $E_1e^{j\Delta\phi_1}$ and $E_2e^{j\Delta\phi_2}$ respectively and assuming that $E_1e^{j\Delta\phi_1}=Ec_1+jEs_1$ and that $E_2e^{j\Delta\phi_2}=Ec_2+jEs_2$, it follows that $E_1=E_2$ and that $\Delta\phi_1=-\Delta\phi_2$ after completion of the compensating operation of the present invention. That is, if a difference signal $(Ec_1-Ec_2)$ and a sum signal $(Es_1+Es_2)$ are produced, these signals become zero only in a case where the compensating operation by the present invention is completed. Consequently, by using the signals $(Ec_1-Ec_2)$ and $(Es_1+Es_2)$ as the control signals for the rotatable phase shifter, the aforesaid compensating state can be set automatically.

FIG. 7 illustrates an embodiment of the first compensating part of the cross polarization compensator of the present invention. In FIG. 7, reference numeral 1 indicates an antenna; 2 and 3 designate rotatable 90° phase shifters; 4 identifies an OMT; 5 denotes a horizontally polarized wave output end; 6 represents a vertically polarized wave output end; 23a and 23b show preamplifiers; 25a and 25b refer to signal branch circuits; 26a and 26b indicate filters each for taking out a counterclockwise revolving pilot signal; 27a and 27b designate filters each for taking out a clockwise revolving pilot signal; 28a, 28b, 28c and 28d identify automatic gain control (AGC) amplifiers each for normalizing the amplitude of a cross polarized wave with the amplitude of a co-polarized wave; 29a and 29b denote gain control circuits; 30a, 30b, 30c and 30d represent detectors; 31a and 31b show phase shifters for changing the phases of signals by 90°; and 32a and 32b refer to adders for providing the sum of or difference between respective two input signals. In the present embodiment, the aforesaid control signals ($Ec_1 - Ec_2$) and ($Es_1 + Es_2$) are available as the outputs from the adders 32a and 32b, and the copolarized wave of a counterclockwise polarized wave is derived from the output end 6 and the co-polarized revolving wave of a clockwise polarized wave is derived from the output end 5. In a case of orthogonal, circularly polarized waves, the 90° phase shifter 2 is automatically set at an angle of 45° and the 90° phase shifter 3 at an angle of 0° or 90°.

In accordance with the present invention, by utilizing that the polarized waves become equal in cross polarization discrimination after compenstion by the first compensating part, the second compensating part can be made simpler in construction than in the prior art, for example, as shown in FIG. 8. In FIG. 8, reference numerals 35 and 36 indicate signal input terminals, which are respectively connected to output terminals 33 and 34 in FIG. 7; 37 and 38 designate variable phase shifters; 39 and 40 identify variable attenuators; and 41a and 41b denote signal combiners. The other components are identified by the same reference numerals as those in FIG. 7 except suffixes. This compensating part produces, by the variable phase shifters 37 and 38 and the variable attenuators 39 and 40, from a copolarized wave component signals which are equal in amplitude but opposite in phase to residual cross polarization components and cancels by these signals the residual cross polarization components by the signal combiners 41a and 41b to provide interference-free signals at the output terminals 42 and 43. As described previously, cross-polarized waves remaining at the input terminals 35 and 36 are equal to each other, while respective phase differences between them and the co-polarized wave are equal in magnitude but opposite in sign. That is, since it holds true that $E_1 = E_2 = E$ and that $\Delta\phi_1 = \Delta\phi_2 = \Delta\phi$, the set values of the two variable attenuators 39 and 40 are equal to each other. On the other hand, one of the two variable phase shifters 37 and 38 is set to a value ($\pi + \Delta\phi$) and the other is set to a value ($\pi - \Delta\phi$). Accordingly, the variable phase shifters 37 and 38 may be controlled by the same control signal while the control signal for the variable attenuators 39 and 40 may also be the same. As these control signals, cross polarization components of one polarized wave at the output end of the compensating part are detected so as to be a perpendicular component and the same phase as the co-polarized wave respectively, so that the variable phase shifters 37 and 38 are assigned to the perpendicular component while the variable attenuators 39 and 40 are assigned the same phase component. When these components are all reduced to zero, the residual cross polarization is cancelled.

As described above, according to the present invention, the control circuit of the second compensating part is required only to detect the cross polarization components of one of two polarized waves, and hence can be made very simple in construction.

FIG. 9 shows, by way of example, the cross polarization discrimination in the OMT output of the first compensating part in a case where received polarized waves are a counterclockwise polarized wave having an axial ratio of 0.7 dB and a clockwise polarized wave having an axial ratio of 0.6 dB and where the included angle of the tilt angles varies. In this example, in the conventional system I two polarized waves are not equal to each other in the cross polarization discrimination after being compensated and, in a case of the clockwise polarized wave, the cross polarization discrimination does not rise above 34 dB. In the system II, the cross polarization discrimination of the counterclockwise polarized wave becomes infinite but that of the clockwise polarized wave becomes as low as 22 dB. According to the present invention, two polarized waves are always equal to each other in cross polarization discrimination and the cross polarization discrimination is higher than that in the system II by about 6 dB. Further, even if compared with the system I, the present invention exhibits far excellent compensation performance in the vicinity of a tilt angle difference 90°.

As has been described in the foregoing, the compensation system of the present invention has the following advantages:

(1) Two polarized waves at the polarizer output after compensation are equal to each other in cross polarization discrimination, and a phase difference between copolarized waves and the cross polarized waves are equal to each other in magnitude and opposite in sign.

(2) In a case of using two 90° phase shifters, their set angle to orthogonal, circularly polarized waves is only one and, as compared with a case of using a 180° phase shifter, the range of rotation of the phase shifter necessary for the compensating operation is small.

(3) The construction of a control circuit of the second compensator provided at the output side of the OMT is simplified.

What we claim is:

1. A cross polarization compensating system comprising:
input means for receiving two elliptically polarized waves of opposite polarities;
two cascade-connected rotatable 90° phase shifters connected to said input means;
transducer means connected to the output of said two cascade-connected rotatable 90° phase shifters and having two perpendicularly intersecting output terminals for producing two cross-polarized wave components of the two elliptically polarized waves from said two perpendicularly intersecting output terminals;
detection means connected to said two perpendicularly intersecting output terminals of said transducer means for detecting two in-phase components of the same phase as their co-polarized components of said two cross-polarized wave components and two orthogonal components each having a phase difference of 90° from a corresponding one of the co-polarized waves of said two cross-polarized wave components;
addition means connected to said detection means for producing an addition output equal to the sum of said two inphase components;
subtraction means connected to said detection means for producing a difference output equal to the difference between said two orthogonal components; and
control means connected to said addition means, said subtraction means and said two cascade-connected rotatable 90° phase shifters to control one of said two phase shifters by said addition output and further to control the other of said two phase shifters by said difference output, so that said two elliptically polarized waves at the output terminals of said transducer means are made equal in the cross polarization, and so that a phase difference between said co-polarized wave components and a phase difference between said cross-polarized wave components are made equal in magnitude and opposite in sign.

2. A cross polarization compensating system according to claim 1, further comprising:

first compensation signal detection means comprising a cascade connection of a first variable phase shifter and a first variable attenuator and connected to one of the two output terminals of said transducer means to produce a first compensation signal;

second compensation signal detection means comprising a cascade connection of a second variable phase shifter and a second variable attenuator and connected to the other of the two output terminals of said transducer means to produce a second compensation signal;

first signal combiner means connected to said one of the two output terminals of said transducer means and the output of said second compensation signal detection means for combining one of said cross polarization wave components with said second compensation signal;

second signal combiner means connected to the other of the two output terminals of said transducer means and the output of said first compensation signal detection means for combining the other of said cross polarization wave components with said first compensation signal; and compensation control means connected to outputs of said first signal combiner means and said second signal combiner means, and said first compensation signal detection means and said second compensation signal detection means for controlling said first variable phase shifter and said second variable phase shifter by a first control signal obtained from in-phase components of the same phase as the co-polarized components of said cross polarization wave components at the outputs of said first signal combiner means and said second signal combiner means and further control said first attenuator and said second attenuator by a second control signal obtained from two orthogonal components of said two cross polarized wave components at the outputs of said first signal combiner means and said second signal combiner means, so that residual cross polarization components are substantially compensated for at the outputs of said first signal combiner means and said second signal combiner means.

* * * * *